(12) United States Patent
Schulken

(10) Patent No.: US 7,581,955 B2
(45) Date of Patent: Sep. 1, 2009

(54) TRANSITIONAL PAPER AND EDUCATIONAL SYSTEM AND METHOD

(75) Inventor: Toni M. Schulken, Charlotte, NC (US)

(73) Assignee: Pathways for Learning Products, Inc., Charlotte, NC (US)

( * ) Notice: Subject to any disclaimer, the term of this patent is extended or adjusted under 35 U.S.C. 154(b) by 832 days.

(21) Appl. No.: 10/964,661

(22) Filed: Oct. 15, 2004

(65) Prior Publication Data

US 2006/0084040 A1    Apr. 20, 2006

(51) Int. Cl.
G09B 11/00    (2006.01)

(52) U.S. Cl. ................................................. 434/162
(58) Field of Classification Search .............. 434/162, 434/163, 164, 165
See application file for complete search history.

(56) References Cited

U.S. PATENT DOCUMENTS

| | | | |
|---|---|---|---|
| 177,120 A | 5/1876 | Harvey | |
| 222,349 A | 12/1879 | Gilman | |
| 335,103 A | 2/1886 | Agar | |
| 433,725 A | 8/1890 | Ewing | |
| 472,751 A | 4/1892 | Earle | |
| 672,087 A | 4/1901 | Williams et al. | |
| 1,324,182 A | 12/1919 | Spaull | |
| 1,493,485 A | 5/1924 | Faust | |
| 2,183,063 A | 12/1939 | Dorsey | |
| 2,922,234 A | 1/1960 | Patterson | |
| 3,514,874 A * | 6/1970 | Strohl | 434/162 |
| 3,638,332 A | 2/1972 | Jones | |
| 3,879,611 A * | 4/1975 | Schroeder | 250/462.1 |
| 4,173,082 A | 11/1979 | Niquette | |
| 4,268,256 A * | 5/1981 | Moskowitz | 434/162 |
| 4,626,219 A * | 12/1986 | Goldreyer | 434/162 |
| 4,669,986 A * | 6/1987 | Yokoyama | 434/164 |
| 4,960,382 A * | 10/1990 | Alford | 434/164 |
| 5,027,523 A * | 7/1991 | MacLeod | 33/564 |
| 5,797,751 A | 8/1998 | Quarles | |
| 6,048,207 A | 4/2000 | Goldin | |
| 6,142,783 A * | 11/2000 | Rocha | 434/164 |
| 6,302,696 B1 | 10/2001 | O'Neill | |
| 6,544,038 B2 | 4/2003 | Bentley | |
| 2006/0078857 A1 * | 4/2006 | Bean | 434/162 |

OTHER PUBLICATIONS

PRO-ED, Inc., Right Line Paper, 1972.
PRO-ED, Inc., T-K Writing Program Narrow-Line Spacing Paper, 1997.
Print Write Paper, 1997.
Start & Stop Practice Paper, wide-ruled 3/4", 1993.
Start & Stop Practice Paper, narrow-ruled 1/2", 1993.

* cited by examiner

Primary Examiner—Kurt Fernstrom
(74) Attorney, Agent, or Firm—Timothy R. Kroboth

(57) ABSTRACT

A transitional writing paper, and educational system and method useful for guiding a penmanship learner in progressing from learning letter formation to legibly printing words and sentences, are disclosed. A writing medium in accordance with the invention, includes consecutive horizontal baselines for printing, and vertically oriented spaced apart line segments that define spaces for printing. The educational system and method beneficially visually cue and teach the learner to print left to right between margin lines, and to otherwise be prepared to properly and legibly print words and sentences on lined notebook paper.

10 Claims, 2 Drawing Sheets

TRANSITIONAL PAPER AND EDUCATIONAL SYSTEM AND METHOD

FIELD OF THE INVENTION

This invention relates to penmanship.

BACKGROUND OF THE INVENTION

Formal handwriting is generally introduced in Kindergarten in the form of learning capital and lower case letter formation. Lower case letters can be grouped into three different types: letters such as b, d, f, h, k, l and t, which include ascenders, that is, a portion that rises above the body of the letter; letters such as g, j, p, q and y, which include descenders, that is, a portion that falls below the body of the letter; and letters such as a, c, e, m, n and so forth, that include neither an ascender or descender.

Letter and numeral formation are taught on primary paper that includes pairs of horizontal parallel lines divided by a horizontal dotted or dashed line. The distance from an upper boundary line to a baseline on primary paper is generally ¾" to 1", and allows a young child to use the large muscles of the arm and hand to learn/feel the motor patterns for letter and numeral formation. The dotted or dashed line divides the space between the upper boundary line and baseline into two equal parts. This type of paper is illustrated by the instructional writing papers of U.S. Pat. No. 3,638,332 to Jones, which uses a green upper boundary line and a red baseline, and U.S. Pat. No. 6,302,696 to O'Neill, and also by Right-Line Paper, which is marked © 1972 by PRO-ED, Inc.

Also known as exemplified by T-K Writing Program Narrow-Line Spacing Paper, marked © 1997 by PRO-ED, Inc., is an instructional writing paper printed in a three-space, four-line grid format that includes non-writing bands that separate the three-space, four-line formats, and a space below the baseline for descenders. This type of instructional paper includes lightly shaded vertical lines that provide approximately ⅜" wide spaces to cue letter and word spacing, and includes left and right margin lines. Like primary dotted line paper, this paper further includes a dashed line serving as a reference for the x-height of a letter, that is, the height of the body of a lower case letter. The baseline and dashed line cooperate to provide x-height spaces of approximately ⅜" height. Other than the dashed lines, the horizontal lines are raised lines, which are particularly useful with learners with special needs who need kinesthetic feedback to print within boundaries. This paper may be visually overstimulating for some learners.

In learning penmanship, children must progress from learning letter formation to legibly printing words and sentences. Factors that contribute to legible writing include correct letter formation, consistent size and height of letters, alignment of letters on the line, and spacing between letters and words. Many of these skills are undeveloped at the time of the transition from primary dotted line paper to wide ruled notebook paper. Many learners run their words together and have difficulty adhering to margins.

To guide some learners in the transition to lined notebook paper, some teachers have tried with some success to use graph paper as writing paper. However, graph paper is not intended for use as a writing paper. Each letter tends to fill up an entire box. In any event, graph paper leaves much to be desired.

There therefore continues to be a longfelt need for a writing paper and educational system and method useful for guiding penmanship learners in transitioning from learning letter formation to legibly printing words and sentences. Beneficially, such a writing paper, system and method would teach margination and appropriate spacing, and assist learners to increase the precision, speed and duration of printing letters, words and sentences. Furthermore, it would be advantageous for such a writing paper and educational system and method to assist learners in the transition to lined notebook paper.

SUMMARY OF THE INVENTION

In accordance with a first aspect of the present invention, there is provided a transitional writing paper useful for guiding in the transition from primary dotted line paper to lined notebook paper. The inventive writing paper is marked with generally uniformly spaced apart horizontal parallel lines. These horizontal lines include at least a first baseline for printing a first plurality of words and a second baseline for printing a second plurality of words, and include an adjacent upper line by which the first baseline is bounded. The second baseline is bounded by the first baseline.

Located between the first baseline and the adjacent upper line, is a first set of vertically oriented spaced apart parallel line segments that partially extend toward the upper line, and located between the second baseline and the first baseline, is a second set of vertically oriented spaced apart parallel line segments that partially extend toward the first baseline.

The inventive paper is additionally marked with a left margin line and a right margin line that perpendicularly intersect the horizontal parallel lines. Conveniently, the horizontal parallel lines extend beyond the left and right margin lines to the side edges of the paper.

The first set of vertically oriented partially extending line segments are generally uniformly spaced apart and beneficially cooperate with the left and right margin lines to define a plurality of spaces that constitute a visual frame of reference for printing, and the second set of vertically oriented partially extending line segments are likewise generally uniformly spaced apart and beneficially cooperate with the left and right margin lines to define a like plurality of spaces. Advantageously, the margin lines include indicia that visually cue left to right printing between the margin lines, and the inventive paper is free of vertically oriented partially extending lines between either margin line and the respective side edge of the paper.

In accordance with further aspects of the invention, an educational system and an educational method are provided for guiding a learner in progressing from learning letter formation to legibly printing words and sentences. The inventive educational system and method include an inventive writing medium in accordance with the present invention. Beneficially, learners are visually cued and taught to print on consecutive baselines, to print left to right between left and right margin lines, to use the vertically oriented partially extending line segments of the spaces as a guide for the x-height of letters, to use the width of the spaces as a guide for letter width and spacing between letters and-between words, and to stop printing at or before the right margin and to continue printing on the next baseline.

In addition, as will become understood, the inventive writing medium may be beneficially used for alignment of multi-digit math problems.

Additional advantages and beneficial features of the present invention are set forth in the drawing and detailed description, and in part will become apparent to those skilled in the art upon examination of the drawing and detailed description or may be learned by practice of the invention. In the drawing and detailed description, there is shown and essentially described only a preferred embodiment of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing which forms a part of the specification of the present invention.

DETAILED DESCRIPTION OF THE INVENTION

The present invention provides a transitional writing paper and educational system and method useful for guiding learners in progressing from learning letter formation on primary dotted line paper, to legibly printing words and sentences, typically on wide ruled notebook paper. This group of penmanship learners are children who have learned letter formation-and are ready to print words and sentences, prior to learning cursive. Generally, these learners are first, second and third grade students, and thus range from about 6 to 9 years of age. However, the present invention is useful at any age for improving legibility while printing.

Figure 1:
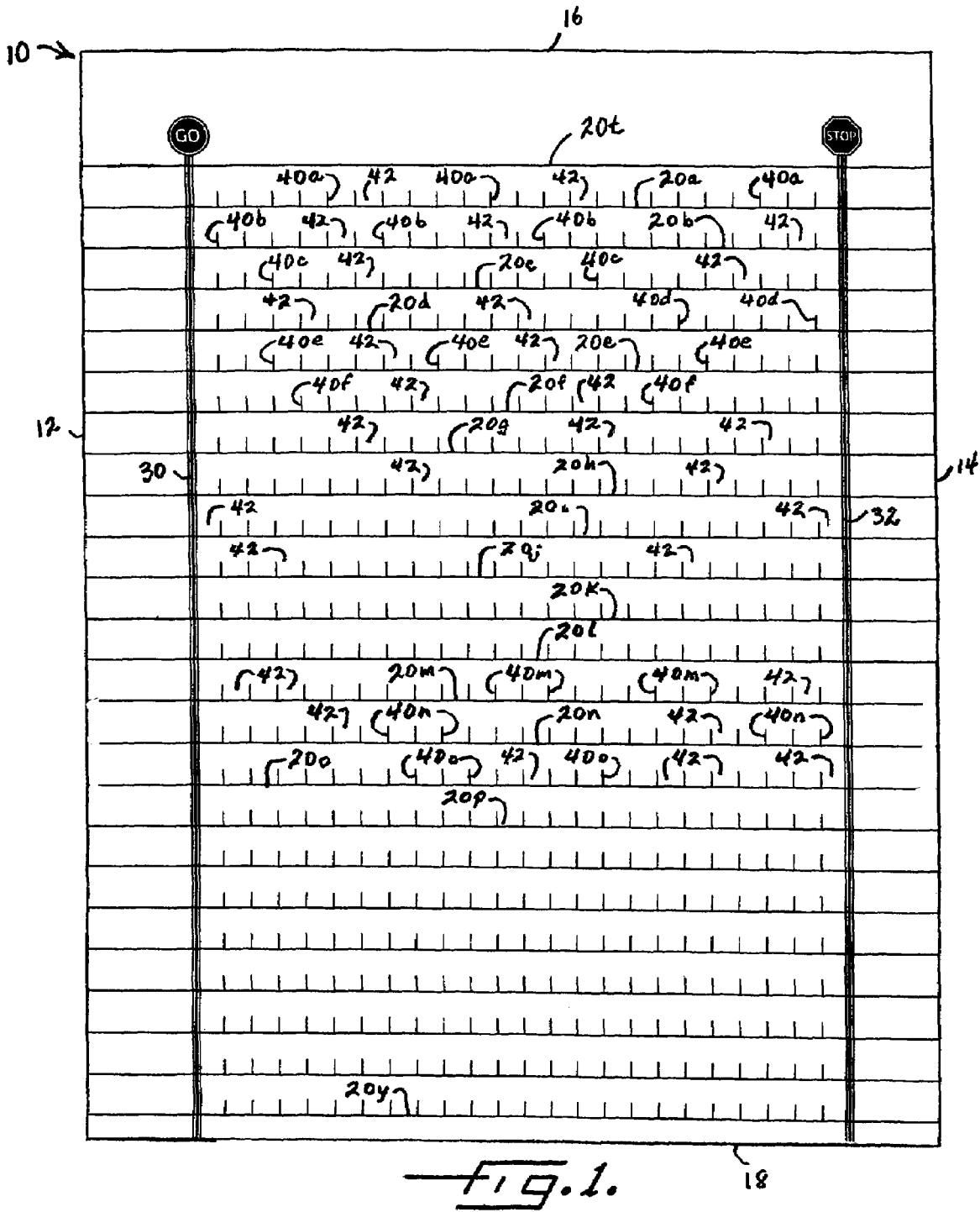
FIG. 1 is a frontal plan view of a preferred embodiment of a writing paper in accordance with the invention.
Figure 2:
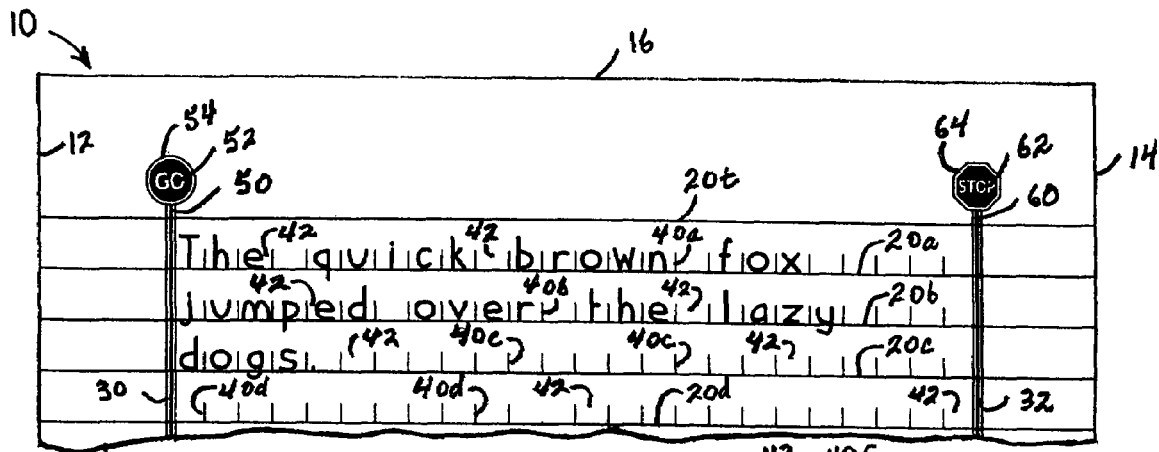
FIG. 2 is a partial plan view of the writing paper of FIG. 1, illustrating its use.

Referring to FIGS. 1 and 2 of the drawing, a preferred transitional writing paper 10 in accordance with the present invention, is conveniently rectangular in shape, having vertical side edges 12,14 and horizontal top and bottom edges 16,18. A convenient size is about 8" wide by 10½" long; however, other sizes can be used. In this description, relative terms such as "horizontal", "vertical", "top", "bottom", "upper", "lower", "above", "below" and the like have been used particularly with reference to the drawing to assist understanding.

With continued reference to FIGS. 1 and 2, preferred writing paper 10 is marked with a plurality of spaced apart horizontal parallel lines 20 that conveniently begin a significant distance from horizontal top edge 16 and continue to within close proximity of horizontal bottom edge 18. Although upper horizontal line 20t could be spaced closer to or further from the top edge, about 1" is convenient for similarity to conventional wide ruled notebook paper. Likewise, lower horizontal line 20y could be spaced closer to or further from the bottom edge, but about 3/16" is convenient for similarity to conventional wide ruled notebook paper and for increased usefulness.

In accordance with the present invention, writing paper 10 is marked with a left margin line 30 and a right margin line 32 that perpendicularly intersect horizontal lines 20. Conveniently, margin lines 30,32 are spaced a significant distance from the respective side edge. For balance, it is convenient for the spacing between side edge 12 and margin line 30 to be substantially the same as the spacing between side edge 14 and margin line 32. Although margin lines 30, 32 could be spaced closer to the respective side edge for increased usefulness of the paper, or could be spaced further from the respective side edge, about 1" is convenient.

Conveniently for similarity to wide ruled notebook paper, horizontal lines 20 may, as particularly shown in FIG. 2, extend from side edge 12 to side edge 14. However, it is within the scope of the invention for the horizontal lines, after intersecting the margin lines, to extend beyond the margin lines but terminate prior to either or both side edges.

For sake of illustration of a specific variation, horizontal lines 20m, 20n, 20o of FIG. 1 are shown to substantially extend from one side edge to the other. By the term "substantially extend" is meant for purposes of this description, that the horizontal lines, after intersecting the margin lines, may terminate a short is distance from either or both side edges, for example, from about ⅜" to about 1/16" of the respective side edge, when the margin lines are spaced about 1" from the sides edges. The variation shown in FIG. 1 with respect to the extent of horizontal lines 20m, 20n, and 20o, is not a preferred feature of writing paper 10; to the contrary, it is convenient for all horizontal lines of a writing paper in accordance with the present invention, to be of the same extent, whether extending from one side edge to the other or terminating prior to either or both side edges.

In accordance with the invention and with continued reference to FIG. 1, horizontal lines 20 include consecutive baselines for printing words and sentences (only consecutive baselines 20a-20e and 20m-20o are so marked). Baseline 20a is bounded by upper adjacent line 20t, baseline 20b is bounded by upper adjacent baseline 20a, and baseline 20c is bounded by upper adjacent baseline 20b, and so forth. With reference again to FIG. 2, only use of baselines 20a-20c is illustrated for printing words and a sentence. As can be recognized, a writing paper in accordance with the present invention, is beneficially free of non-writing bands and of horizontal dotted or dashed lines that can obscure portions of letters.

Figure 4:
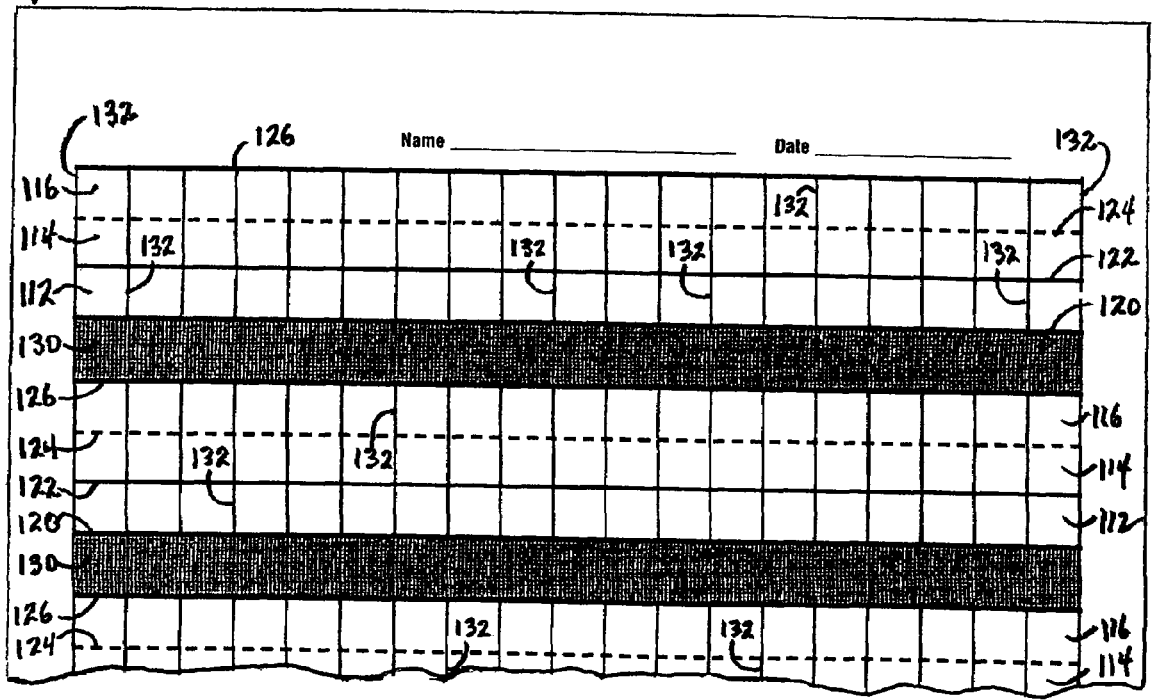
FIG. 4 is a partial plan view of prior art writing paper.

By comparison and with reference to FIG. 4, prior art, writing paper 110 is printed in a three-space (the spaces being designated 112, 114, 116), four line grid format (the lines being designated 120, 122, 124, 126), and includes non-writing bands 130 that separate the three-space, four line formats. Line 122 of each four line format is a baseline for printing letters, space 112 is for descenders, and dashed line 124 serves as a reference for half-space letters.

In accordance with a preferred embodiment of the invention, located between each baseline and the adjacent upper line, are vertically oriented spaced apart parallel line segments 40 that partially extend toward the adjacent upper line. With continued reference to FIG. 1 in particular, line segments 40a are located between baseline 20a and adjacent upper line 20t, line segments 40b are located between baseline 20b and adjacent upper baseline 20a, line segments 40c are located between baseline 20c and adjacent upper baseline 20b, and so forth. Conveniently, as shown, line segments 40 intersect with, and extend from, the respective baseline 20; however, if desired, partially extending line segments 40a could be spaced from baseline 20a a short distance, say, for example, 1/32" (as likewise all partially extending line segments could be spaced a short distance from the respective baselines).

Figure 3:
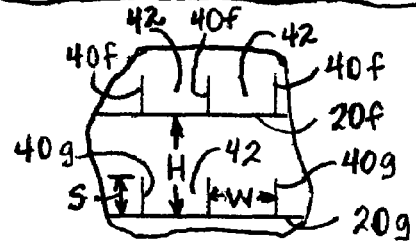
FIG. 3 is an enlarged view of a representative portion of the writing paper of FIG. 1.

In accordance with the invention and with continued reference to FIG. 1, vertically oriented, partially extending line segments 40 are generally uniformly spaced apart, and are advantageously located only between left margin line 30 and right margin line 32. Partially extending spaced apart line segments 40 define a plurality of spaces 42 that constitute a visual frame of reference for printing. Beneficially, referring now particularly to FIG. 3, spaces 42 are of less height than width (the letter "S" designating space height from the respective baseline, and the letter "W" designating space width), so as to be rectangular in shape. The height S defines the x-height of letters. Advantageously, spaces 42 are about twice as wide as high.

In accordance with a highly preferred embodiment of this invention, the height S guides a learner progressing from learning letter formation to legibly printing words and letters, to use a developmentally appropriate x-height for letters, and the width W guides the learner to use a developmentally appropriate letter size and for appropriate spacing between letters and between words. In this regard, the width W is particularly intended to promote the use of dynamic finger movements when printing letters. Although a slightly greater or lesser height can be chosen, about 1/8" is beneficial for the height S, and although a slightly greater or lesser width can be chosen, about 1/4" is beneficial for the width W.

By comparison and referring again to FIG. 4, baseline 122 and adjacent dashed line 124 of the prior art T-K Writing Program Narrow-Line Spacing Paper, measure about 3/8" apart, and vertical lines 132 measure about 3/8" apart. Thus, the grid format of prior art paper 110 defines a plurality of square spaces. Furthermore, a spacing of 3/8" for the height S would not be advantageous for a developmentally appropriate x-height, as it would encourage whole hand movement, rather than precise finger movements, when printing letters.

Referring again to FIG. 2, partially extending line segments 40 conveniently form a plurality of vertically aligned spaces 42. Thus, for example, the letter "h" on baseline 20a and the letter "u" on baseline 20b, and the letter "o" on baseline 20c are conveniently in vertical alignment with one another. Vertical alignment of spaces 42 is also useful for using the inventive writing medium for multi-digit math problems.

With continued reference to FIG. 1, adjacent horizontal lines 20 are generally uniformly spaced apart from each other. Beneficially, the horizontal lines are spaced apart a height H relative to the height S that provides appropriate spacing above partially extending line segments 40 for ascenders and below the baselines for descenders. Accordingly, in the present invention, it would not be advantageous for the height S to be half of the height H. Instead, the height S should be less than half of the height H, advantageously about one-third of the height H.

In accordance with a highly preferred embodiment of this invention, the height H takes into account developmentally appropriate letter size. In this regard, although a slightly greater or lesser spacing distance can be chosen, about 3/8" spacing is beneficial for the height H when the height S is about 1/8".

By comparison and referring again to FIG. 4, dashed line 124 divides the spacing distance between baseline 122 and upper line 126 of prior art paper 110 in half so that spaces 114 and 116 are of equal height. In addition, any spacing distance for the height H that would encourage whole hand movement, rather than precise finger movements, would not be advantageous for developmentally appropriate letter size as writing demands rise to meet the need for increased speed and endurance.

Beneficially, to visually cue left to right printing between left and right margin lines 30, 32, margin lines 30, 32 may include appropriate indicia such as colors, symbols, words, and any combination thereof. Thus, the left margin line may be green in color (not shown), and in addition, as shown, may include at an upper line end 50 that conveniently is located above line 20t, a cue word 52 and a cue symbol 54, such as the word "GO" within a circle. Likewise, to visually cue the learner to stop before or at the right margin line, the right margin line may be red in color (not shown), and in addition, as shown, may include at an upper line end 60 that conveniently is located above line 20t, a cue word 62 and a cue symbol 64, such as the word "STOP" within a stop sign symbol.

As can be recognized, the features described for a writing paper in accordance with the present invention, can be applied to other writing media. Examples of other useful writing media include chalkboard slates, dry erase surfaces, and electronic media.

In accordance with the inventive educational system and method, a transitional writing medium in accordance with the present invention, is used to guide a learner in progressing from learning letter formation to legibly printing words and sentences. In accordance with the inventive educational system, the learner is beneficially visually cued to print on consecutive baselines, and to use left to right printing between left and right margin lines on baselines that extend beyond the margin lines, and to use vertically oriented, partially extending line segments of spaces as a guide for the x-height of letters, and to use the width of the spaces as a guide for letter size and for spacing between letters and between words.

In addition, the learner is advantageously visually cued by the spaces and the right margin line to stop printing on a baseline at or before the right margin line, and then is advantageously visually cued by the left margin line and the spaces on the adjacent below baseline, to continue printing on the adjacent below baseline. The inventive system beneficially further includes teaching the learner to print in accordance with the visual cueing.

The inventive educational method beneficially includes teaching the learner to increase precision based on cues for letter size that encourage small dynamic movements of the fingers, rather than whole arm movements; to increase speed by eliminating having to plan where to place each letter on a line and in relation to one another; and to increase the duration of printing letters, words and sentences by making it is an easier task. To achieve these goals, the inventive educational method beneficially includes teaching the learner to print on consecutive baselines, and left to right printing between left and right margin lines on baselines that extend beyond the margin lines, and to use the height of the vertically oriented, partially extending line segments as a guide for a developmentally appropriate x-height of letters, and to use the width of the spaces as a guide for developmentally appropriate letter width and for spacing between letters and between words.

Furthermore, a learner printing words on, for example, baseline 20a of writing paper 10 is advantageously taught to count the number of spaces 42 remaining to the right margin line and to begin the next word on baseline 20b when the number of letters of the next word exceeds the number of the remaining spaces. Thus, the learner is taught to stop before or at the right margin line. In addition, the inventive educational method beneficially visually cues the learner to print consistent with the teaching provided.

As mentioned, the drawing shows a frontal plan view of writing paper 10. Conveniently, for increased usefulness, the backside of paper 10 corresponds to the front.

The present invention may be carried out with various modifications without departing from the spirit or essential attributes thereof. Accordingly, reference should be made to the appended claims, rather than to the foregoing specification as indicating the scope of the invention.

The invention claimed is:

1. An educational method for guiding a learner in progressing from learning letter formation to legibly printing words and sentences, said method comprising providing a transitional writing medium marked with a plurality of generally uniformly spaced apart horizontal parallel lines that comprise consecutive baselines comprising a first baseline and a second baseline, and that comprise an adjacent upper line by which said first baseline is bounded, wherein said second baseline is bounded by said first baseline; and located between said first baseline and said adjacent upper line, a first set of vertically oriented, generally uniformly spaced apart parallel line segments that partially extend toward said upper line, and located between said second baseline and said first baseline, a second set of vertically oriented, generally uniformly spaced apart parallel line segments that partially extend toward said first baseline; wherein the spaced apart partially extending line segments define spaces of less height than width; and a left margin line and a right margin line that perpendicularly intersect said horizontal parallel lines, wherein said spaces are located between said left margin line and said right margin line;

visually cueing left to right printing between said left margin line and said right margin line on said first baseline and said second baseline;

visually cueing the learner to use the vertically oriented partially extending line segments of said spaces as a guide for the x-height of printed letters; and visually cueing the learner to use the width of said spaces as a guide for letter size and spacing between letters and between words.

2. An educational method comprising providing a transitional writing medium marked with a plurality of generally uniformly spaced apart horizontal parallel lines that comprise consecutive baselines comprising a first baseline, a second baseline, and an adjacent upper line, wherein said second baseline is below said first baseline; and located between said first baseline and said adjacent upper line, a first set of vertically oriented, generally uniformly spaced apart parallel line segments that partially extend toward said upper line, and located between said second baseline and said first baseline, a second set of vertically oriented, generally uniformly spaced apart parallel line segments that partially extend toward said first baseline; wherein the spaced apart partially extending line segments define a height, and cueing use of said height as a guide for the x-height of printed letters.

3. An educational method for guiding a learner in progressing from learning letter formation to legibly printing words and sentences, said method comprising providing a transitional writing medium marked with a plurality of generally uniformly spaced apart horizontal parallel lines that comprise consecutive baselines comprising a first baseline for printing a first plurality of words and a second baseline for printing a second plurality of words, and that comprise an adjacent upper line by which said first baseline is bounded, wherein said second baseline is bounded by said first baseline; and located between said first baseline and said adjacent upper line, a first set of vertically oriented parallel line segments that partially extend toward said upper line a height that guides the learner to use a developmentally appropriate x-height for letters, wherein said vertically oriented line segments are generally uniformly spaced apart from one another a width that defines spaces that constitute a visual frame of reference for printing letters having a developmentally appropriate letter width and for spacing; and located between said second baseline and said first baseline, a second set of vertically oriented parallel line segments that partially extend toward said first baseline said height, wherein said vertically oriented line segments of said second set are generally uniformly spaced apart from one another said width; and a left margin line and a right margin line that perpendicularly intersect said horizontal parallel lines, wherein said spaces are located between said left margin line and said right margin line; and b) teaching the learner to print on said consecutive baselines;

c) teaching the learner left to right printing between said left margin line and said right margin line on said first baseline and said second baseline, which extend beyond said left margin line and said right margin line;

d) teaching the learner to use said height of the vertically oriented partially extending line segments as a guide for said developmentally appropriate x-height of letters;

e) teaching the learner to use Bald width of said spaces as a guide for said developmentally appropriate letter width and for spacing between letters and between words; and f) teaching the learner printing on said first baseline to count the number of said spaces remaining to said right margin line and to begin the next word on said second baseline when the number of letters of said next word exceeds said number of the remaining spaces.

4. An educational method comprising providing a transitional writing medium marked with a plurality of generally uniformly spaced apart horizontal parallel lines that comprise consecutive baselines comprising a first baseline for printing a first plurality of words, a second baseline for printing a second plurality of words, and an adjacent upper line, wherein said second baseline is below said first baseline; and located between said first baseline and said adjacent upper line, a plurality of vertically oriented parallel line segments that partially extend toward said upper line, wherein said vertically oriented line segments are generally uniformly spaced apart from one another; and teaching use of the height of said line segments as a guide for a developmentally appropriate x-height of printed letters.

5. The educational method of claim 4, wherein said vertically oriented line segments are spaced apart from one another a width that defines spaces that constitute a visual frame of reference for printing letters; and teaching use of said width of said spaces as a guide for developmentally appropriate printed letter width and for spacing between printed letters and between words.

6. The educational method of claim 5, wherein said writing medium further comprises cues for left to right printing, and a left margin line and a right margin line, further comprising teaching printing on said consecutive baselines, teaching left to right printing using said cues, and teaching a learner printing on said first baseline to count the number of said spaces remaining to said right margin line and to begin the next word on said second baseline when the number of letters of said next word exceeds said number of the remaining spaces.

7. The educational method of claim 4, wherein said writing medium is selected from the group consisting of writing paper, chalkboard slates, dry erase surfaces and electronic media.

8. The educational method of claim 2, wherein said writing medium further comprises a left margin line and a right margin line, and wherein the spaced apart partially extending line segments also define spaces of less height than width, further comprising cueing use of said width of said spaces as a guide for printed letter size and spacing between Printed letters and between words.

9. The educational method of claim 8, wherein said writing medium further comprises cues for left to right printing, further comprising cueing printing on said consecutive baselines, cueing left to right printing, and cueing a learner printing on said first baseline to stop printing at or before said right margin line and continue printing on said second baseline, whereby a learner is visually cued by said method.

10. The educational method of claim 2, wherein said writing medium is selected from the group consisting of writing paper, chalkboard slates, dry erase surfaces and electronic media.

\* \* \* \* \*